United States Patent [19]
Abraham et al.

[11] Patent Number: 5,022,366
[45] Date of Patent: Jun. 11, 1991

[54] ROTARY ENGINE WITH DUAL SPARK PLUGS AND FUEL INJECTORS

[75] Inventors: John Abraham, Wayne; Frediano V. Bracco, Princeton, both of N.J.

[73] Assignee: John Deere Technologies International, Inc., Moline, Ill.

[21] Appl. No.: 408,572

[22] Filed: Sep. 18, 1989

[51] Int. Cl.⁵ ............................................. F02B 53/10
[52] U.S. Cl. ..................................... 123/205; 123/211
[58] Field of Search ............................... 123/205, 211

[56] References Cited

U.S. PATENT DOCUMENTS

| | | | |
|---|---|---|---|
| 3,228,183 | 1/1966 | Feller | 123/205 X |
| 3,980,054 | 9/1976 | Kono | |
| 4,036,183 | 7/1977 | Igashira et al. | |
| 4,083,329 | 4/1978 | Myers | |
| 4,085,712 | 4/1978 | Myers et al. | 123/205 |
| 4,664,607 | 5/1987 | Jones | |

OTHER PUBLICATIONS

Jones et al., "An Update of the Direct Injected Stratified Charge Rotary Combustion Engine Developments at Curtis-Wright", SAE Paper No. 770044, Feb. 28–Mar. 4, 1977.

Primary Examiner—Michael Koczo

[57] ABSTRACT

A stratified charge rotary combustion engine includes a main fuel injector, a pair of spark plugs and a piot fuel injector. The first spark plug is located upstream of the pilot fuel injector. The second spark plug is located upstream of the main fuel injector and is located upstream of the center of the top-dead-center region of the housing.

2 Claims, 2 Drawing Sheets

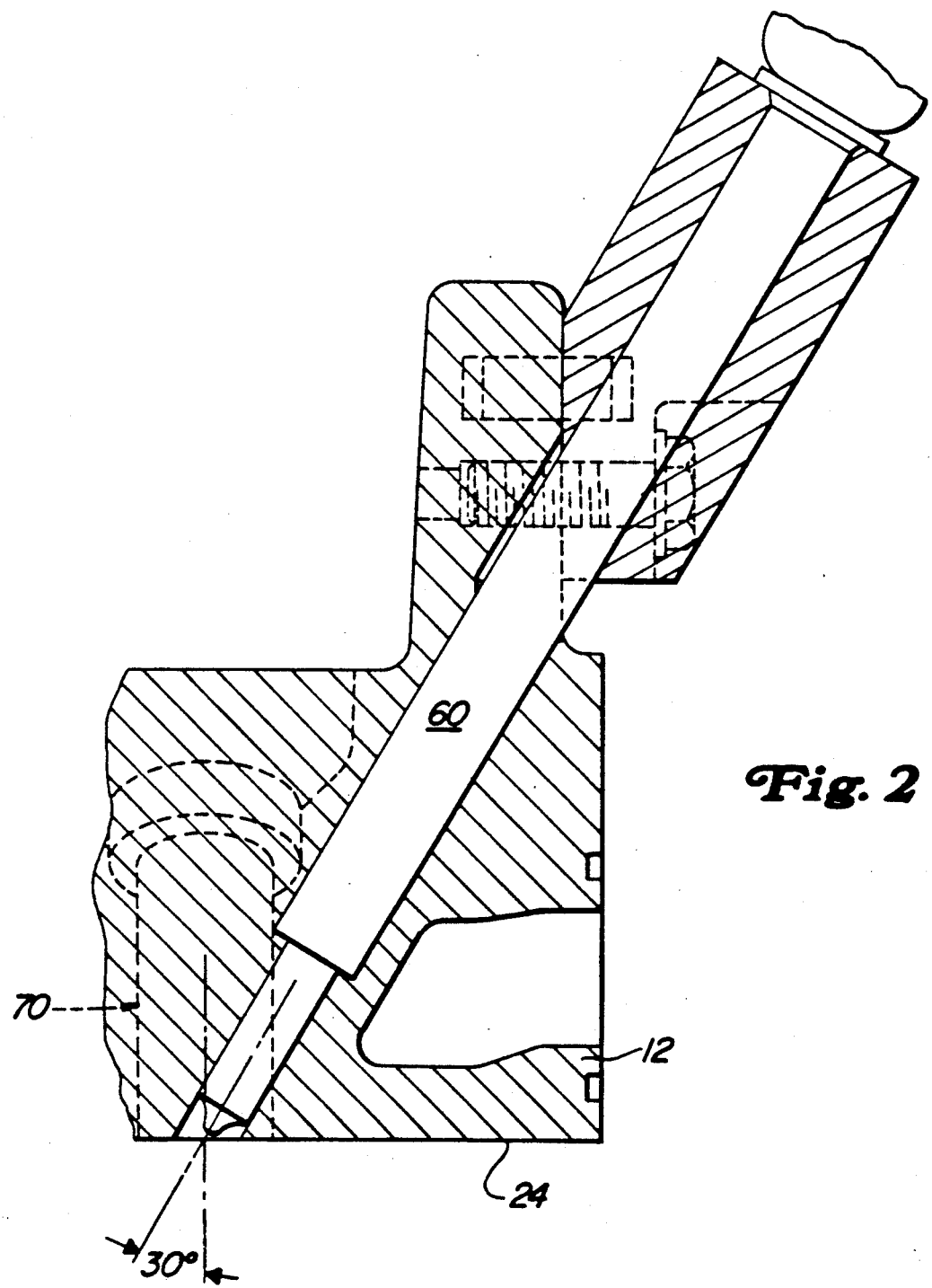

ROTARY ENGINE WITH DUAL SPARK PLUGS AND FUEL INJECTORS

BACKGROUND OF INVENTION

This invention was made with Government support under Contract No. NAS3-24628 awarded by the National Aeronautics and Space Administration. The Government has certain rights in this invention.

The invention relates to rotary internal combustion engines of the type disclosed in prior U.S. Pat. No. 2,988,065 granted on June 13, 1961 to Wankel et al, and particularly to such an engine designed for operation as a stratified charge engine and employing two high pressure fuel injection nozzles, as disclosed in U.S. Pat. No. 4,083,329 granted on 11 April 1978 to Meyers.

Various stratified charge rotary engine designs are known, one such design being described in the aforementioned Meyers Patent. This system includes a pilot fuel injector, a main fuel injector and a single spark plug which ignites fuel from the pilot injector. The burning pilot fuel then ignites the fuel/air mixture in the rotating combustion pocket injected by the main injector. It is believed that the presence of a richer-than-flammable fuel/air mixture in the center of the pocket retards the flame propagation from the leading portion of the pocket to the trailing portion, even though a flammable fuel/air mixture is available on the trailing side of the richer-than-flammable mixture. This may slow down the burning process and reduce combustion efficiency.

Other stratified charge arrangements are described in U.S. Pat. No. 3,980,054 issued 14 September 1976 to Kono and in U.S. Pat. No. 4,036,183 issued 19 July 1977 to Igashira et al. These systems include a pair of spark plugs located on either side of the minor axis of the rotor housing. However, the engine described in these latter patents have fuel injection systems wherein fuel is introduced in the air intake passage almost opposite to the top-dead-center region of the engine. The spark plug arrangement shown in the '054 and '183 patents could not be utilized with the pilot/main fuel injector arrangement of the '329 patent. Accordingly, it would be desirable to provide a pilot/main injector type stratified charge fuel injection system which could accommodate a pair of spark plugs.

SUMMARY OF THE INVENTION

An object of the present invention is to provide a stratified charge rotary combustion engine with improved combustion efficiency.

These and other objects are achieved by the present invention wherein a rotary internal combustion engine includes main and pilot fuel injectors. The main fuel injector is positioned between the two spark plugs and has a central axis which is inclined with respect to the plane of rotor rotation.

BRIEF DESCRIPTION OF DRAWINGS

FIG. 2 is a sectional view taken along lines 2—2 of FIG. 1.

DETAILED DESCRIPTION

Figure 1:
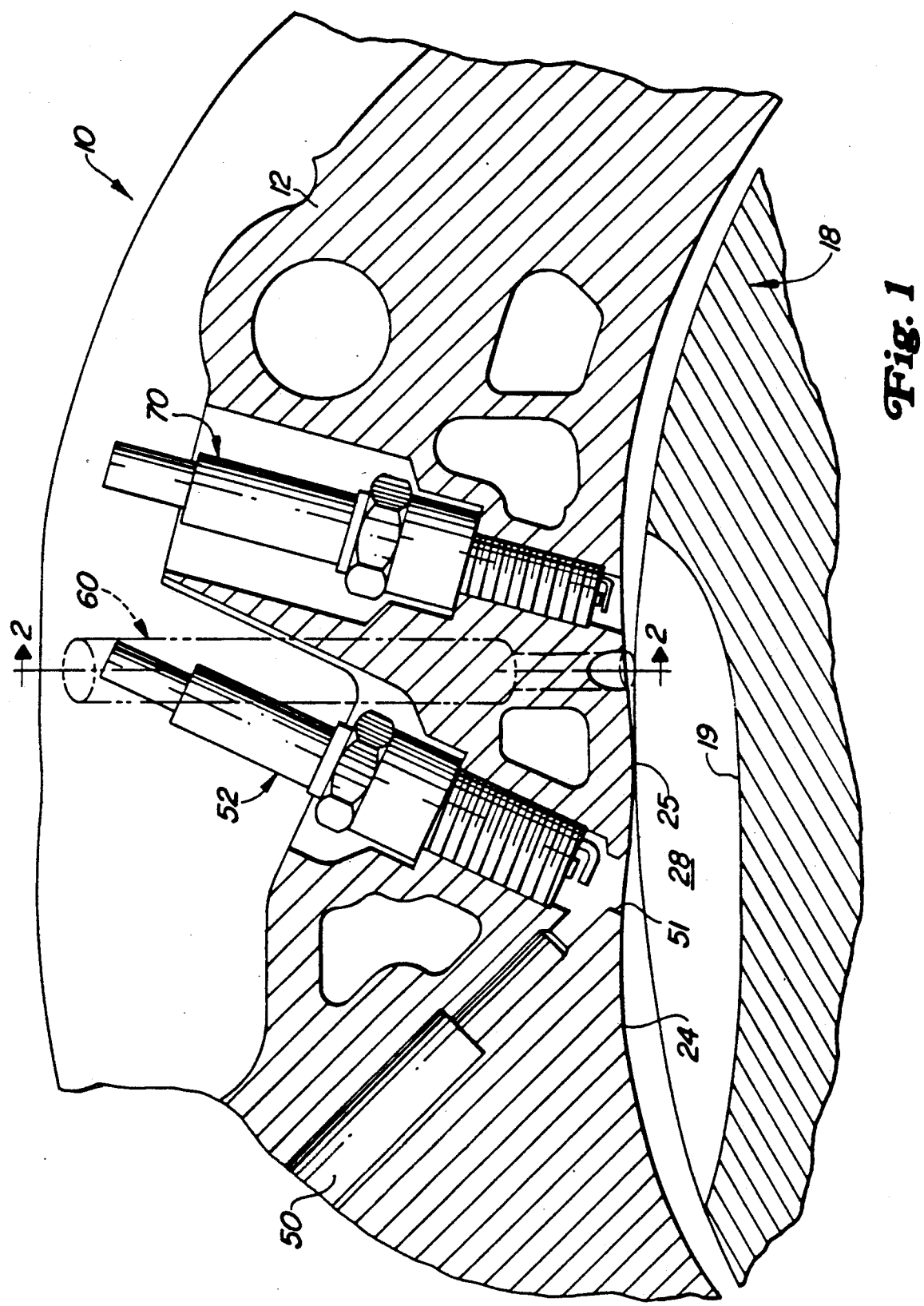
FIG. 1 is a schematic partial transverse sectional view of a top-dead-center region of a rotary combustion engine embodying the invention.

Referring to FIGS. 1 and 2, a rotating combustion engine 10 comprises an outer body or housing consisting of two axially spaced end housings (not shown) and an intermediate or rotor housing 12, the housings being secured together to form the engine cavity therebetween. An inner body or rotor 18 is journaled for rotation within said housing cavity on an eccentric portion of a shaft (not shown) which extends coaxially through and is supported by bearings (not shown) in the end housings.

The peripheral inner or running surface 24 of the intermediate housing 12 has a two-lobe profile which preferably is basically an epitrochoid, the two lobes joining at minor axis or junction 25. Each of the three working faces of the rotor 18 preferably is provided with a trough-like recess 19 therein.

The engine 10 also includes suitable gearing (not shown) between the rotor 18 and the engine housing to control the relative rotation of the rotor. Such gearing is conventional and preferably is similar to that illustrated in the aforementioned patent to Wankel et al.

A pilot fuel injector 50 is mounted on the intermediate housing 12 adjacent to and downstream of the lobe junction 25. The pilot injector 50 has its fuel discharge end disposed in a recess 51 opening to the trochoidal surface 24 for discharging fuel into each working chamber after the air-intake charge within the chamber has been substantially compressed and combustion is about to be initiated. A first spark plug type igniter 52 is also mounted on the intermediate housing adjacent to the lobe junction 25 and adjacent to and upstream from the injector 50. The electrodes of the spark plug 52 are disposed adjacent to the discharge end of the injector 50 preferably so that the injector discharge end and the spark plug electrodes both open through the trochoidal surface 24 through the same common recess 51. In addition, the injector 50 and spark plug 52 preferably are disposed so that at least a portion of the fuel vapor produced by fuel spray discharged from the pilot injector passes in close proximity to the spark plug electrodes as the fuel leaves the pilot injector for ready ignition by the spark plug 52.

A main fuel injector 60 is mounted on the intermediate housing 12 also adjacent to the lobe junction 25 but on the upstream side of the junction. As best seen in FIG. 2, the main injector 60 is inclined with respect to the plane of rotation of the rotor 18 by approximately 30 degrees. As in the case of the pilot injector 50, the main fuel injector 60 is arranged to initiate the discharge of its fuel into each working chamber 28 after the air charge in the chamber has been substantially compressed and combustion is about to be initiated in a timely manner relative to discharge of fuel from the pilot injector 50. For example, at low engine loads discharge of fuel from the main injector 60 into each working chamber 28 may be initiated somewhat after fuel is discharged from the injector 50 whereas at high engine loads in order to provide time for fuel discharge from the main injector 60, the fuel discharge from this main injector can be initiated somewhat before fuel is discharged from the pilot injector 50. As a result, the combustion flame resulting from the ignition by the spark plug 52 of the fuel discharging from the pilot injector 50 into each working chamber 28 is effective to ignite the fuel discharged from the main injector 60 into the chamber. Thus, the burning fuel discharged by the pilot fuel injector 50 functions as a pilot flame to ignite the fuel discharged by the main injector 60.

A second spark plug type ignition device 70 is positioned adjacent to and upstream of the main injector 60 so that the main injector is located generally between the first and second spark plugs 52 and 70. The pilot injector 50 and the spark plugs 52 and 70 are aligned with the plane of rotation of the rotor 18.

As described in U.S. Pat. No. 3,894,518 to Gavrun et al, an ignition circuit (not shown) for the spark plug 52 is arranged to fire the spark plug while fuel is discharging from the nozzle 50 into a working chamber 29 so that a portion of this fuel is ignited at the fuel injector 50 as it discharges from the injector and the burning of this initial portion of the fuel discharged from the injector 50 ignites the balance of the fuel discharging from the injector. The timing of the spark from the spark plug 52 is such that it fires during the period of discharge from the injector 50 into a working chamber 28 and preferably during the initial period of such discharge into each working chamber 28. The second spark plug 70 would be fired to ignite the flammable mixture on the trailing side of the minor axis, and upstream of the richer-than-flammable mixture (not shown) in the central region of the combustion pocket. It is predicted that this two-spark plug arrangement will better ignite the fuel/air mixture and improve the combustion efficiency.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. In a stratified charge rotary combustion engine having a housing having a running surface surrounding a working chamber, the running surface having a two-lobed profile, the lobes forming a junction in a top-dead-center region of the housing, a rotor mounted for rotation in the working chamber, a fuel injection and ignition system placed in the top-dead center region, the fuel injection and ignition system comprising:

a pilot fuel injector for injecting fuel into the working chamber;

a first spark plug located upstream of the pilot fuel injector for igniting fuel injected by the pilot fuel injector, the pilot fuel injector and the first spark plug being located on a downstream side of the junction;

a main fuel injector for injecting fuel into the working chamber, the ignited pilot fuel acting to ignite fuel injected by the main injector; and a second spark plug located upstream of the main fuel injector and located upstream of the junction for igniting fuel/air mixture in the working chamber, the main injector being positioned generally between the first and second spark plugs.

2. The invention of claim 1, wherein the main injector is inclined with respect to a plane of rotation of the rotor.

* * * * *